(12) United States Patent
Kim et al.

(10) Patent No.: US 12,188,664 B2
(45) Date of Patent: Jan. 7, 2025

(54) FAN, AIR CONDITIONER INCLUDING THE FAN, AND METHOD FOR MANUFACTURING THE FAN

(71) Applicant: SAMSUNG ELECTRONICS CO., LTD., Gyeonggi-do (KR)

(72) Inventors: Byungghun Kim, Gyeonggi-do (KR); Hyunggeun Park, Gyeonggi-do (KR); Hwansoo Lee, Gyeonggi-do (KR); Inwon Choi, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 524 days.

(21) Appl. No.: 17/434,194

(22) PCT Filed: Aug. 11, 2021

(86) PCT No.: PCT/KR2021/010619
§ 371 (c)(1),
(2) Date: Aug. 26, 2021

(87) PCT Pub. No.: WO2022/055136
PCT Pub. Date: Mar. 17, 2022

(65) Prior Publication Data
US 2023/0175710 A1 Jun. 8, 2023

(30) Foreign Application Priority Data

Sep. 9, 2020 (KR) .......................... 10-2020-0115634
Sep. 9, 2020 (KR) .......................... 10-2020-0115656

(51) Int. Cl.
F24F 1/0022 (2019.01)
B29C 45/33 (2006.01)
(Continued)

(52) U.S. Cl.
CPC ............ *F24F 1/0022* (2013.01); *B29C 45/33* (2013.01); *F04D 29/24* (2013.01); *F04D 29/42* (2013.01);
(Continued)

(58) Field of Classification Search
CPC .... F24F 1/0022; F24F 13/20; F24F 2013/205; F24F 2221/14; B29C 45/33;
(Continued)

(56) References Cited

U.S. PATENT DOCUMENTS 6,328,533 B1 12/2001 Decker et al.
7,744,350 B2 * 6/2010 Ogino .................... F04D 29/30
415/206
(Continued)

FOREIGN PATENT DOCUMENTS

EP 2 730 787 A2 5/2014
EP 3 093 499 A1 11/2016
(Continued)

OTHER PUBLICATIONS

International Search Report dated Nov. 8, 2011 in Application No. PCT/KR2021/010619.
(Continued)

*Primary Examiner* — Allen R. B. Schult
(74) *Attorney, Agent, or Firm* — STAAS & HALSEY, LLP

(57) ABSTRACT

A fan includes an inlet part disposed to form a fan inlet, a base disposed to form, together with the inlet part, a fan outlet, and a blade. The blade extends from the base to the inlet part, and includes a first guide surface having an inclination toward an outside of the fan in a radial direction of the fan which changes in a direction from the inlet part toward the base, and a second guide surface having an inclination toward the outside of the fan in the radial
(Continued)

direction which changes in a direction from the base toward the inlet part.

7 Claims, 12 Drawing Sheets

(51) Int. Cl.
    *B29L 31/08*       (2006.01)
    *F04D 29/24*       (2006.01)
    *F04D 29/42*       (2006.01)
    *F24F 13/20*       (2006.01)

(52) U.S. Cl.
    CPC ........ *F24F 13/20* (2013.01); *B29C 2045/338* (2013.01); *B29L 2031/08* (2013.01); *F24F 2013/205* (2013.01); *F24F 2221/14* (2013.01)

(58) Field of Classification Search
    CPC ... B29C 2045/338; F04D 29/24; F04D 29/42; B29L 2031/08
    USPC ......................................................... 454/233
    See application file for complete search history.

(56) References Cited

U.S. PATENT DOCUMENTS

| | | | |
|---|---|---|---|
| 8,668,460 B2 * | 3/2014 | Han | ........................ F04D 29/30 416/241 R |
| 8,807,949 B2 | 8/2014 | Hammel et al. | |
| 10,662,968 B2 | 5/2020 | Son et al. | |
| 11,421,704 B2 | 8/2022 | Gruber et al. | |
| 2006/0228212 A1 | 10/2006 | Sadi | |
| 2011/0223526 A1 * | 9/2011 | Oki | ...................... G03G 9/0827 430/108.7 |
| 2015/0354584 A1 | 12/2015 | Iwata et al. | |
| 2017/0101993 A1 | 4/2017 | Kang et al. | |

FOREIGN PATENT DOCUMENTS

| | | |
|---|---|---|
| EP | 2 730 787 A3 | 5/2018 |
| EP | 3 034 885 B1 | 1/2020 |
| EP | 3 660 405 A1 | 6/2020 |
| JP | 9-250786 A | 9/1997 |
| JP | 2856210 | 2/1999 |
| JP | 2002-364591 A | 12/2002 |
| JP | 5522306 | 6/2014 |
| JP | 5955402 B2 | 7/2016 |
| JP | 5975557 | 8/2016 |
| KR | 2003-0051088 A | 6/2003 |
| KR | 10-2014-0133430 | 11/2014 |
| KR | 10-1677030 B1 | 11/2016 |
| KR | 10-1720491 B1 | 3/2017 |
| KR | 10-1764430 B1 | 8/2017 |
| KR | 10-2018-0109306 | 10/2018 |
| KR | 10-2018-0130336 | 12/2018 |
| KR | 10-2124929 | 6/2020 |

OTHER PUBLICATIONS

Office Action dated Nov. 30, 2023 issued in European Application No. EP 21 86 7002 including the partial supplementary European search report.

Office Action dated Feb. 21, 2024 issued in European Application No. EP 21 86 7002 including the extended European search report.

* cited by examiner

FAN, AIR CONDITIONER INCLUDING THE FAN, AND METHOD FOR MANUFACTURING THE FAN

CROSS REFERENCE TO RELATED APPLICATIONS

This application is filed under 35 U.S.C. § 371 as a National Stage of PCT International Application No. PCT/KR2021/010619, filed on Aug. 11, 2021, in the Korean Intellectual Property Office, which claims the priority benefit of Korean Patent Application No. 10-2020-0115634, filed on Sep. 9, 2020, in the Korean Intellectual Property Office, and of Korean Patent Application No. 10-2020-0115656, filed on Sep. 9, 2020, in the Korean Intellectual Property Office. Each of the disclosures of PCT International Application No. PCT/KR2021/010619, Korean Patent Application No. 10-2020-0115634, and Korean Patent Application No. 10-2020-0115656 are incorporated by reference herein in their entirety.

BACKGROUND

1. Field

The disclosure relates to an air conditioner, and to a fan of the air conditioner.

2. Description of Related Art

In general, a fan is a device that blows air by a rotational force and may be used in a refrigerator, an air conditioner, a vacuum cleaner, and the like. Such a fan may be classified into an axial fan, and a centrifugal fan according to an air suction method and an air discharge method, and a shape thereof.

Further, various filters may be installed in an air conditioner. Because the filters interrupt an air flow of the air conditioner, a centrifugal fan that has a higher positive pressure than that of other types of fans is applied to the air conditioner.

The centrifugal fan is a fan that forces a fluid, which is introduced in an axial direction, to be blown in a radial direction by a rotation of blades. In general, the centrifugal fan includes a base on which a fan motor is installed, a plurality of blades provided at regular intervals between the base and an inlet part, and the inlet part forming an inlet. An outlet of the centrifugal fan may be formed along a circumference of the centrifugal fan between the base and the inlet part.

As for the centrifugal fan including the above-mentioned configuration, as the fan motor is driven, air is introduced along a rotation axis direction through the inlet, and the introduced air is discharged through the outlet between the plurality of blades.

SUMMARY

Additional aspects will be set forth in part in the description which follows and, in part, will be apparent from the description, or may be learned by practice of the disclosed embodiments.

According to examples of the disclosure, a fan includes an inlet part provided or disposed to form a fan inlet, a base provided or disposed to form, together with the inlet part, a fan outlet, and a blade. The blade extends from the base to the inlet part, and includes a first guide surface having an inclination toward an outside of the fan in a radial direction of the fan which changes in a direction from the inlet part toward the base, and a second guide surface having an inclination toward the outside of the fan in the radial direction which changes in a direction from the base toward the inlet part.

The blade may include a first surface facing the outside of the fan in the radial direction, and a second surface facing an inside of the fan in the radial direction, and the first guide surface and the second guide surface may be located or disposed on the second surface.

The inlet part may include a core guide located or disposed at a portion of the inlet part which is in contact with the first surface of the blade and the core guide may be provided or disposed in a plane perpendicular to a rotation axis of the fan.

The inlet part may include an end portion, inclined at a predetermined angle with respect to a direction parallel to a rotation axis of the fan to guide air, which is introduced from the fan inlet, to the fan outlet.

The blade may include a stepped portion formed at a boundary between the first guide surface and the second guide surface.

The stepped portion may include a first stepped portion having a surface which faces the first guide surface, and a second stepped portion having a surface which faces the second guide surface.

The inlet part, the base, and the blade may be integrally injection-molded so as to form a single piece.

According to examples of the disclosure, an air conditioner includes a housing including a housing inlet, a heat exchanger located or disposed inside the housing, and a fan configured to suction air to an inside of the housing and discharge the air to an outside of the housing. The fan may include an inlet part through which air introduced to the inside of the housing is introduced, a base to which a fan motor configured to rotate the fan is mounted, and a blade. The blade may extend from the base to the inlet part, and include a first guide surface inclined in a first direction, a second guide surface inclined in a second direction different from the first direction, and a stepped portion formed at a boundary between the first guide surface and the second guide surface.

The blade may include a first surface facing an outside of the fan in a radial direction, and a second surface facing an inside of the fan in the radial direction. The first guide surface, the second guide surface, and the stepped portion may be located or disposed on the second surface.

The inlet part may include a core guide located or disposed at a portion of the inlet part which is in contact with the first surface of the blade and the core guide may be provided or disposed in a plane perpendicular to a rotation axis of the fan.

The fan may be configured such that, when or as the fan is rotated, a positive pressure may be formed on the first surface and a negative pressure may be formed on the second surface.

The inlet part may include an end portion, inclined at a predetermined angle with respect to a direction parallel to a rotation axis of the fan, to guide air, which is introduced from the fan inlet, to the fan outlet.

The housing may include an inlet guide provided or disposed to guide air, which is introduced through the housing inlet, to the fan, and the inlet guide may be formed to correspond to the end portion of the inlet part.

The stepped portion may include a first stepped portion having a surface which faces the first guide surface, and a second stepped portion having a surface which faces the second guide surface.

The inlet part, the base, and the blade, may be integrally injection-molded so as to form a single piece.

According to examples of the disclosure, a method for manufacturing a fan includes injection molding the fan by injecting resin into a mold, separating a first inner core in a first direction parallel to a rotation axis direction of the fan, separating a second inner core in a direction close to a rotation axis of the fan, separating an inner mold in the first direction, separating a first outer core in a direction away from the rotation axis of the fan, and moving a second outer core in a second direction opposite to the first direction, and then separating the second outer core in the direction away from the rotation axis of the fan. Separating the second outer core in the direction away from the rotation axis of the fan may include guiding the second outer core by a first guide surface formed on the fan to be inclined in the direction away from the rotation axis of the fan as the first guide surface extends along the second direction. Separating the inner mold in the first direction may include guiding the inner mold by a second guide surface formed on the fan to be inclined in a direction away from the rotation axis of the fan as the second guide surface extends along the first direction.

The method for manufacturing the fan may further include separating the first outer core and the second outer core from the fan through a fan outlet.

The method for manufacturing the fan may further include separating the inner mold from the fan through a fan inlet.

BRIEF DESCRIPTION OF THE DRAWINGS

The above and other aspects, features and advantages of the disclosure will become more apparent from the following description of example embodiments with reference to the accompanying drawings, in which.

DETAILED DESCRIPTION

Figure 1:
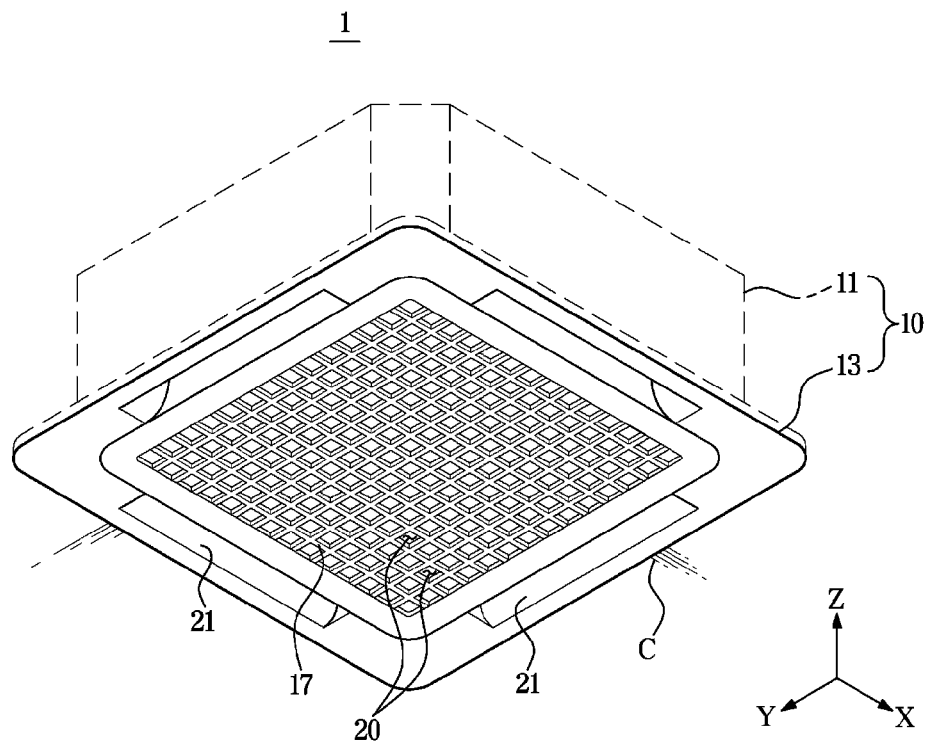
FIG. 1 is a view illustrating an air conditioner according to an embodiment of the disclosure.

Embodiments described in the disclosure and configurations shown in the drawings are merely examples of the embodiments of the disclosure, and may be modified in various different ways at the time of filing of the application to replace the embodiments and drawings of the disclosure.

In addition, the same reference numerals or signs shown in the drawings of the disclosure indicate elements or components performing substantially the same function.

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, elements are not limited by these terms. These terms are only used to distinguish one element from another element. For example, without departing from the scope of the disclosure, a first element may be termed as a second element, and a second element may be termed as a first element.

The term of "and/or" includes a plurality of combinations of relevant items or any one item among a plurality of relevant items. For example, the scope of the expression or phrase "A and/or B" includes the item "A", the item "B", and the combination of items "A and B".

In addition, the scope of the expression or phrase "at least one of A and B" is intended to include all of the following: (1) at least one of A, (2) at least one of B, and (3) at least one A and at least one of B. Likewise, the scope of the expression or phrase "at least one of A, B, and C" is intended to include all of the following: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C.

When it is stated in the disclosure that one element is "connected to" or "coupled to" another element, the expression encompasses an example of a direct connection or direct coupling, as well as a connection or coupling with another element interposed therebetween.

In the following detailed description, the terms of "upper portion", "lower portion" and the like may be defined by the drawings, but the shape and the location of the component is not limited by the term.

In addition, a case in which a fan is applied to a ceiling-type air conditioner will be described as an example, but the fan may be appliable to other types of air conditioners such as a stand-type air conditioner or a wall-mounted air conditioner, and other home appliances such as a refrigerator and a cleaner.

The disclosure relates to providing a fan having an improved performance, an air conditioner including the fan, and a method for manufacturing the fan.

According to examples of the disclosure described herein, because a fan may be formed as a single piece, it is possible to reduce the number of points, in which energy loss may occur, in comparison with a case in which a fan is manufactured by manufacturing each component of the fan. Therefore, it is possible to improve the performance of the fan.

According to examples of the disclosure described herein, because a fan is formed in such a way that an inlet part is formed along an air flow direction, it is possible to reduce energy loss due to turbulence.

Hereinafter example embodiments of the disclosure will be described in detail with reference to the accompanying drawings.

Figure 2:
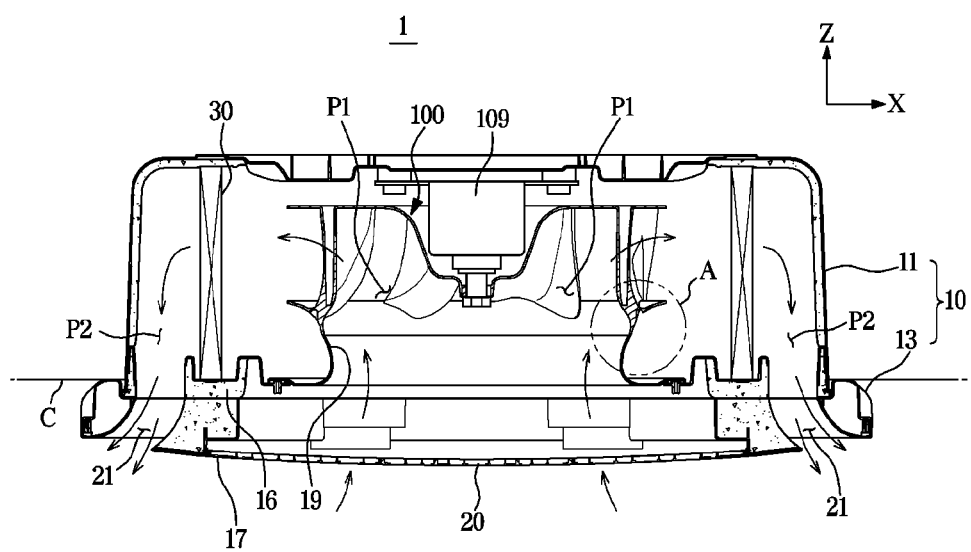
FIG. 2 is a longitudinal sectional view of the air conditioner shown in FIG. 1.

FIG. 1 is a view illustrating an air conditioner according to an embodiment of the disclosure. FIG. 2 is a longitudinal sectional view of the air conditioner shown in FIG. 1.

Referring to FIGS. 1 and 2, an air conditioner 1 according to an embodiment of the disclosure may be installed on a ceiling C. At least a portion of the air conditioner 1 may be embedded in the ceiling C.

The air conditioner 1 may include a housing 10 including a housing inlet 20 and a housing outlet 21, a heat exchanger 30 provided inside the housing 10, and a fan 100 configured to move air.

The housing 10 may have a rectangular housing shape that is opened downward to allow components of the air conditioner 1 to be accommodated therein. The housing 10 may include an upper housing 11 located inside the ceiling C, and a lower housing 13 coupled to a lower side of the upper housing 11.

The housing inlet 20, through which air is introduced, may be formed in a central portion of the lower housing 13, and the housing outlet 21, through which air is discharged, may be formed at an outer circumference (periphery) of the housing inlet 20. An inlet flow path P1, in which air, which is introduced through the housing inlet 20, flows, may be provided between the housing inlet 20 and the fan 100, and an outlet flow path P2, in which air, which is discharged by the fan 100, flows, may be provided between the housing outlet 21 and the fan 100.

The housing outlet 21 may be formed adjacent to each edge so as to correspond to the outer circumference of the lower housing 13. For example, four housing outlets 21 may be formed as illustrated in FIG. 1, on each side of the lower housing 13 which may have a rectangular or square shape. That is, two housing outlets 21 may be formed in an X-axis direction and two housing outlets 21 may be formed in a Y-axis direction. The four housing outlets 21 are arranged to discharge air to all four sides of a room, respectively. With the structure, the air conditioner 1 may suction air from a lower side, cool or heat the suctioned air, and then discharge the cooled or heated air to the lower side again.

A grill 17 may be coupled to a bottom of the lower housing 13 to filter out dust in the air introduced into the housing inlet 20.

The housing 10 may include an inlet guide 19. The inlet guide 19 may be provided to guide air, which is introduced through the housing inlet 20, to the fan 100.

The heat exchanger 30 may be formed in a rectangular ring shape and located on an outer side of the fan 100 in the housing 10. The heat exchanger 30 is not limited to a rectangular ring shape, and may be provided in various shapes, such as a circular shape, an oval shape, or a polygonal shape.

The heat exchanger 30 may be placed on (or above) a drain tray 16, and thus condensed water generated in the heat exchanger 30 may be collected in the drain tray 16. The drain tray 16 may be formed in a shape corresponding to a shape of the heat exchanger 30. That is, when the heat exchanger 30 has a rectangular ring shape, the drain tray 16 may also have a rectangular ring shape, and when the heat exchanger 30 has a circular shape, the drain tray 16 may also have a circular shape.

The fan 100 may be installed in a substantially central portion of the housing 10. The fan 100 may be located inside the heat exchanger 30. The fan 100 may be a centrifugal fan configured to suction air in an axial direction and discharge the air in a radial direction. A fan motor 109 configured to drive the fan 100 may be provided in the air conditioner 1.

With the configuration, the air conditioner 1 may suction air from the room, cool the suctioned air, and then discharge the cooled air to the room, or heat the suctioned air, and then discharge the heated air to the room.

Figure 3:
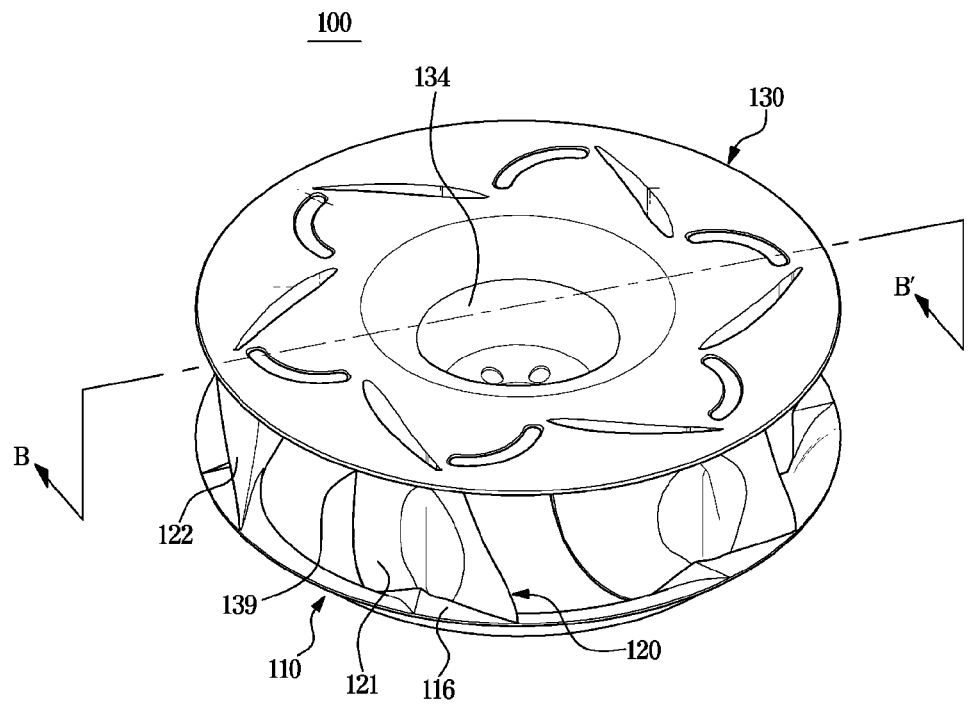
FIG. 3 is a view illustrating the fan shown in FIG. 2.
Figure 4:
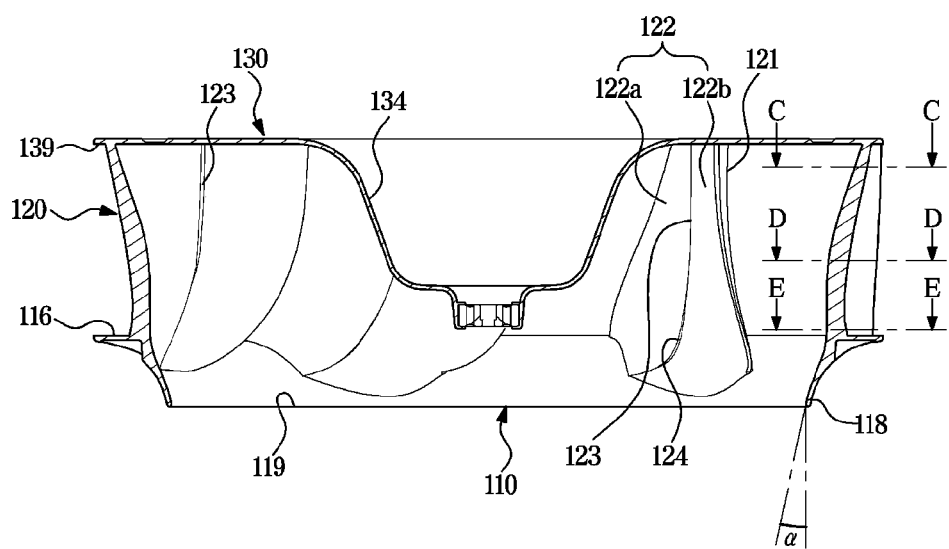
FIG. 4 is a sectional view taken along line B-B shown in FIG. 3.
Figure 5:
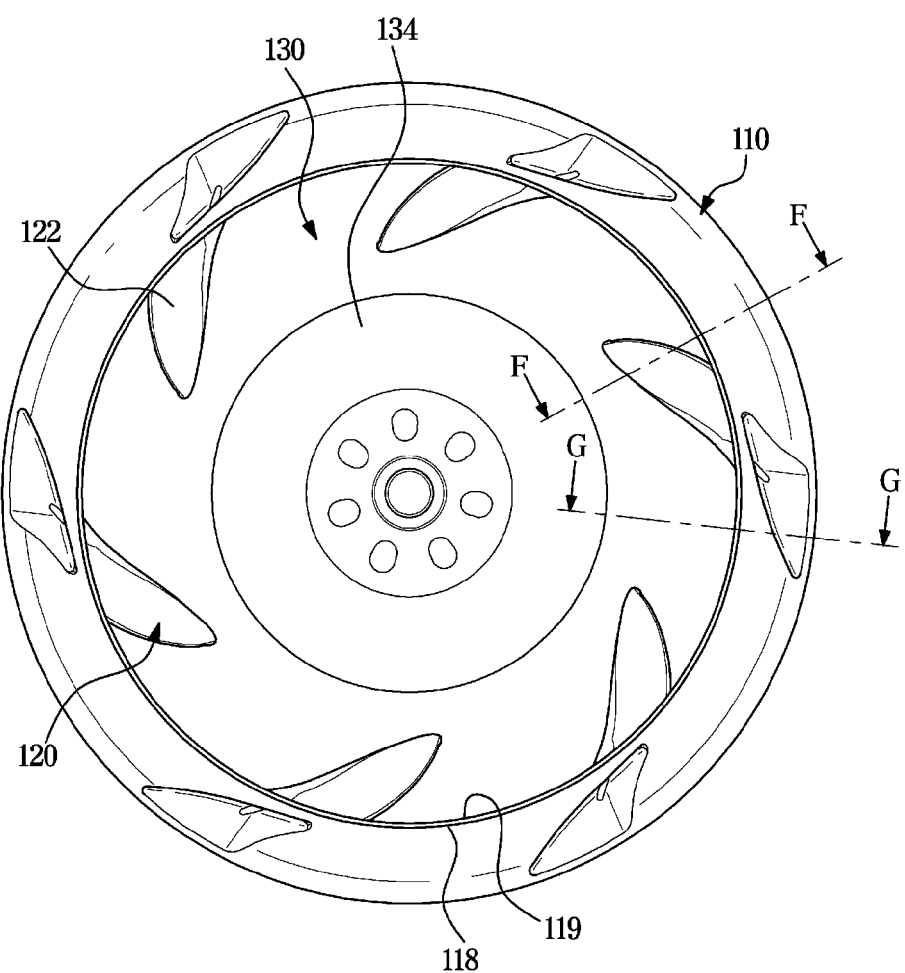
FIG. 5 is a view illustrating a lower portion of the fan shown in FIG. 3.
Figure 6:
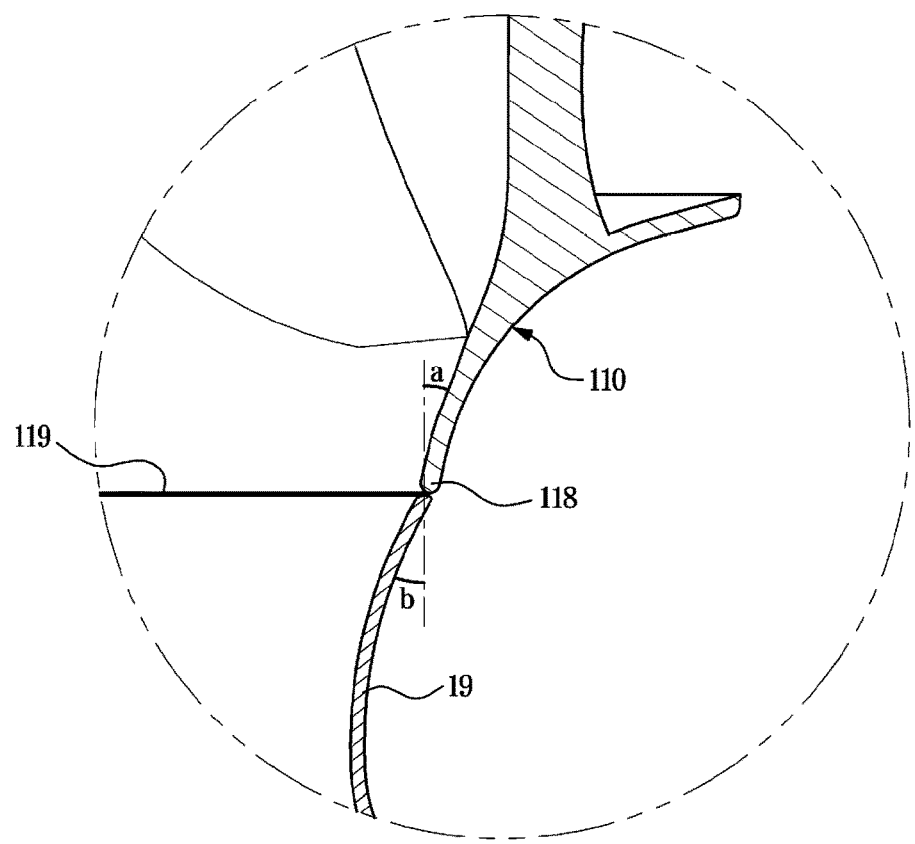
FIG. 6 is an enlarged view of a portion A shown in FIG. 2.
Figure 7:
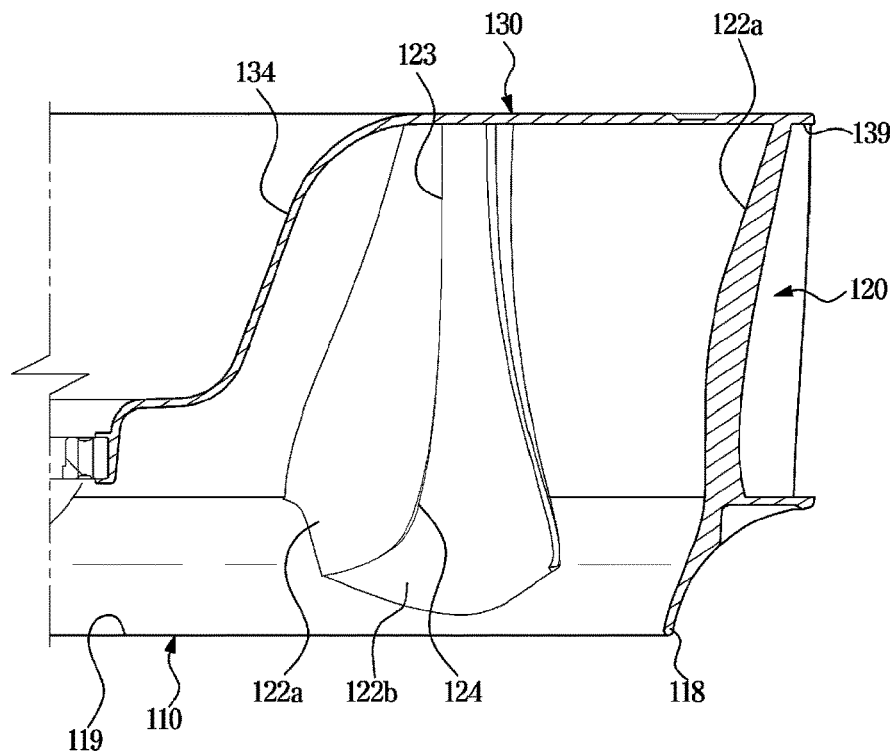
FIG. 7 is a sectional view taken along line F-F shown in FIG. 5.
Figure 8:
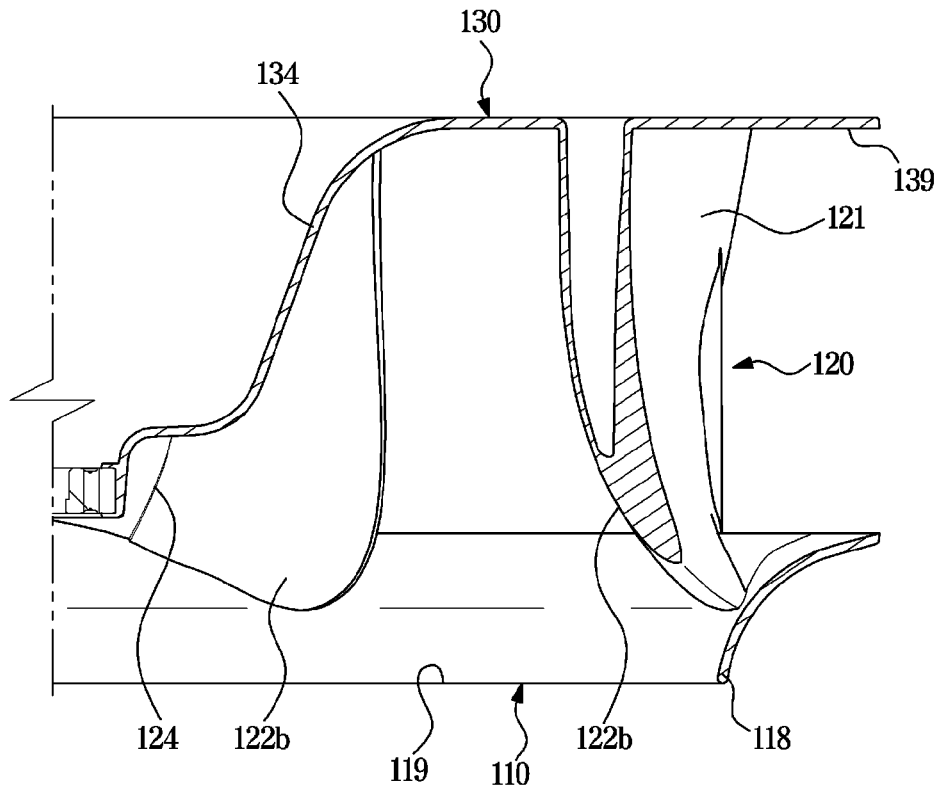
FIG. 8 is a sectional view taken along line G-G shown in FIG. 5.
Figure 9:
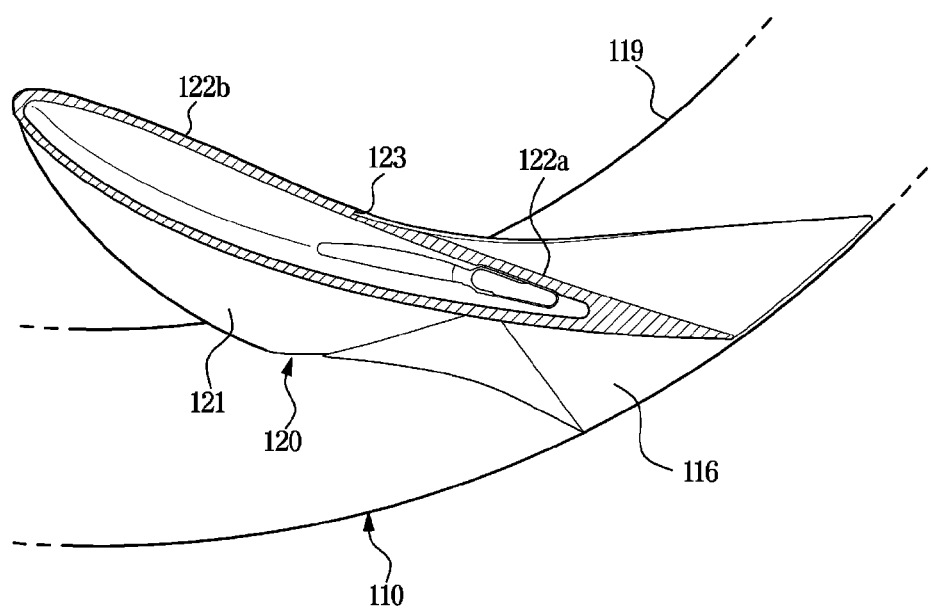
FIG. 9 is a sectional view taken along line C-C shown in FIG. 4.
Figure 10:
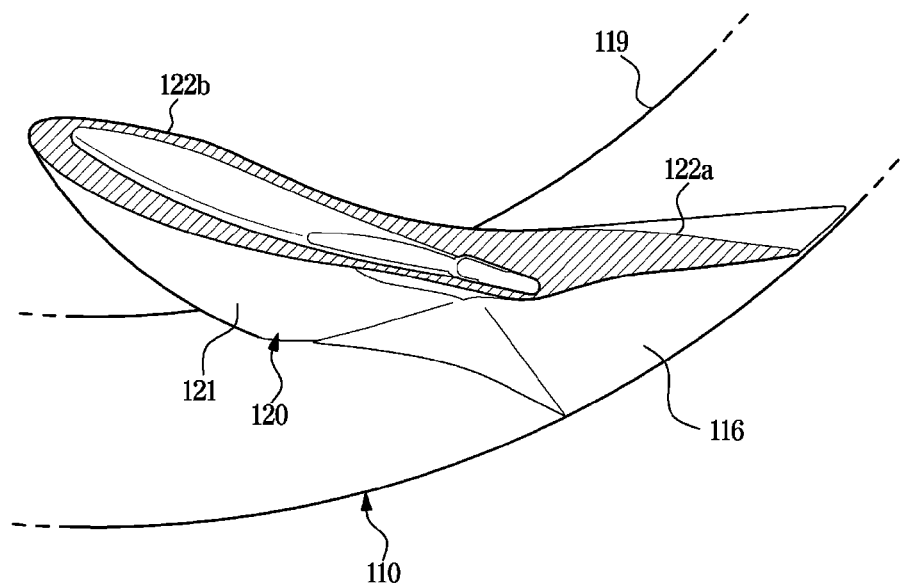
FIG. 10 is a sectional view taken along line D-D shown in FIG. 4.
Figure 11:
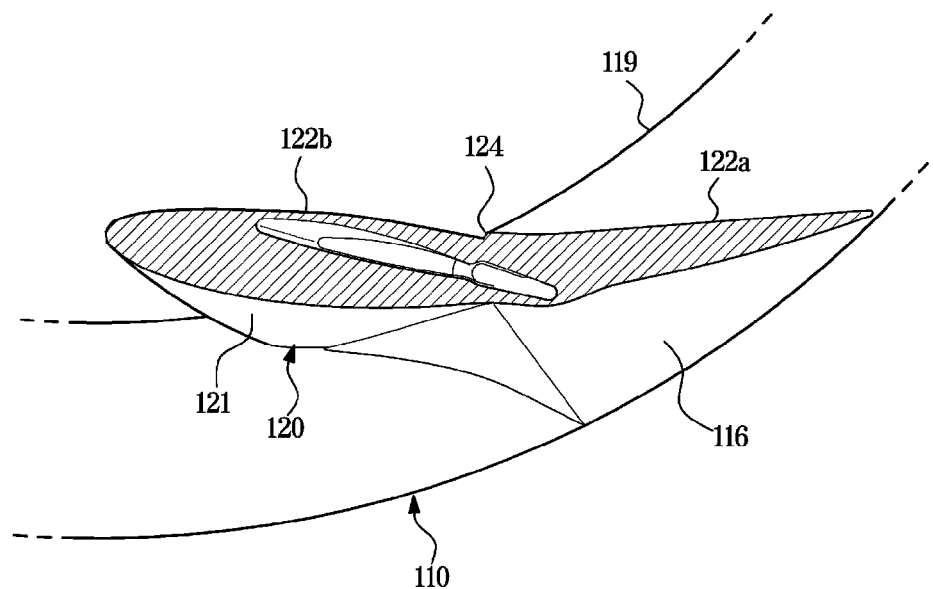
FIG. 11 is a sectional view taken along line E-E shown in FIG. 4.

FIG. 3 is a view illustrating the fan shown in FIG. 2. FIG. 4 is a sectional view taken along line B-B shown in FIG. 3. FIG. 5 is a view illustrating a lower portion of the fan shown in FIG. 3. FIG. 6 is an enlarged view of a portion A shown in FIG. 2. FIG. 7 is a sectional view taken along line F-F shown in FIG. 5. FIG. 8 is a sectional view taken along line G-G shown in FIG. 5. FIG. 9 is a sectional view taken along line C-C shown in FIG. 4. FIG. 10 is a sectional view taken along line D-D shown in FIG. 4. FIG. 11 is a sectional view taken along line E-E shown in FIG. 4.

Referring to FIGS. 3 to 5, the fan 100 may include an inlet part 110, a blade 120, and a base 130. The inlet part 110, the blade 120, and the base 130 may be integrally formed. The fan 100 may be injection molded as a single piece.

The inlet part 110 may be formed in a substantially circular shape. The inlet part 110 may have a substantially doughnut shape with an open center. The inlet part 110 may form a fan inlet 119. Air may be introduced into the fan 100 through the fan inlet 119. The inlet part 110 has a shape provided to guide the air, which is introduced through the fan inlet 119, to be discharged through a fan outlet 139. The inlet part 110 may have a shape in which the inlet part 110 is widened outward in the radial direction as the inlet part 110 is close to an upper end.

Referring to FIGS. 4 and 6, an end portion 118 forming the fan inlet 119 of the inlet part 110 may be formed to be inclined at a predetermined angle (a) with respect to a rotation axis direction. The end portion 118 of the inlet part 110 may have a shape that is narrowed inward in the radial direction as the end portion 118 is close to a lower end. The end portion 118 of the inlet part 110 may extend along a direction in which air is introduced and discharged. The end portion 118 of the inlet part 110 may be formed to allow air, which is introduced through the fan inlet 119, to be smoothly moved toward the fan outlet 139.

The inlet guide 19 may be formed to correspond to the fan inlet 119 of the inlet part 110. The inlet guide 19 may be inclined at a predetermined angle (b) with respect to the rotation axis direction of the fan 100. The inlet guide 19 may have a shape that is widened outward in the radial direction as the inlet guide 19 is close to a position in which air is introduced. The inlet guide 19 may be inclined in substantially the same direction as the end portion 118 of the inlet part 110.

The inlet part 110 may include a core guide 116, and the core guide 116 is provided to guide outer cores 243 and 244 (see FIGS. 12-19) in response to the outer cores 243 and 244 of a manufacturing apparatus 2 being separated in a process of manufacturing the fan 100. The core guide 116 may be formed in a plane substantially perpendicular to the rotation axis of the fan 100. The core guide 116 may be formed substantially parallel to the base 130. The core guide 116 may be formed on a portion, which is in contact with a first surface 121 of the blade 120, of the inlet part 110. In response to a second outer core 244 being separated after a first outer core 243 is separated from the fan 100, the core guide 116 may guide the second outer core 244. The second outer core 244 may be easily separated from the fan 100 by the core guide 116.

The blade 120 may be positioned between the inlet part 110 and the base 130. The blade 120 may extend from the base 130 to the inlet part 110. The blade 120 may be spaced apart by a predetermined distance along a circumference of the fan 100 and may be provided in plurality. The blade 120 may include the first surface 121 on which a positive pressure is formed as the fan 100 is rotated, and a second surface 122 on which a negative pressure is formed as the fan 100 is rotated. The first surface 121 may be formed to face outward in the radial direction, and the second surface 122 may be formed to face inward in the radial direction. As the fan 100 is rotated by the fan motor 109, the fan 100 may suction air by the negative pressure formed on the second surface 122 and discharge the air by the positive pressure formed on the first surface 121.

The second surface 122 may include a first guide surface 122a and a second guide surface 122b, and the first guide surface 122a may guide separation of the outer cores 243 and 244 and the second guide surface 122b may guide separation of inner cores 241 and 242 and separation of a second mold 220. The first guide surface 122a may be inclined in a direction different from a direction of the second guide surface 122b.

Referring to FIG. 7, the first guide surface 122a may be formed to correspond to a direction in which the outer cores 243 and 244 are separated. The first guide surface 122a may be inclined to the outside in the radial direction as the first guide surface 122a is close to or adjacent to an upper end of the blade or fan. The first guide surface 122a may be inclined to the outside in the radial direction as the first guide surface 122a is close to or adjacent to the base 130.

Referring to FIG. 8, the second guide surface 122b may be formed to correspond to a direction in which the inner cores 241 and 243 and the second mold 220 are separated. The second guide surface 122b may be inclined to the outside in the radial direction as the second guide surface 122b is close to a lower end.

The blade 120 may include stepped portions 123 and 124 formed at a portion where the first guide surface 122a and the second guide surface 122b, which are inclined in different directions, are in contact with each other. The stepped portions 123 and 124 may be positioned at a boundary between the first guide surface 122a and the second guide surface 122b.

Referring to FIG. 9 illustrating a sectional view taken along line C-C shown in FIG. 4 when viewed from above, a first stepped portion 123 may be formed on an upper portion of the blade 120. The second guide surface 122b may be inclined to the outside in the radial direction as the second guide surface 122b is close to the inlet part 110. Because the first guide surface 122a is inclined to the outside in the radial direction as the first guide surface 122a is close to the upper portion of the blade 120, the second guide surface 122b protrudes relatively more than the first guide surface 122a. Accordingly, the first stepped portion 123 is formed to include a surface facing the first guide surface 122a.

Referring to FIG. 10 illustrating a sectional view taken along line D-D shown in FIG. 4 when viewed from above, the first guide surface 122a and the second guide surface 122b may be in contact with each other to form substantially the same plane in a substantially central portion of the blade 120.

Referring to FIG. 11 illustrating a sectional view taken along line E-E shown in FIG. 4 when viewed from above, the second stepped portion 124 may be formed at a lower portion of the blade 120. Because the second guide surface 122b is inclined to the outside in the radial direction as the second guide surface 122b is close to a lower portion of the blade 120, the first guide surface 122a protrudes relatively more than the second guide surface 122b. Accordingly, the second stepped portion 124 is formed to include a surface facing the second guide surface 122b.

The blade 120 according to an embodiment of the disclosure includes the first guide surface 122a and the second guide surface 122b formed with different inclinations toward the base 130 from a substantially central portion between the base 130 and the inlet part 110, and the first guide surface 122a and the second guide surface 122b are formed with different inclinations toward the inlet part 110 from a substantially central portion between the base 130 and the inlet part 110. Therefore, it is possible to reduce the size of the stepped portion by 1/2 in comparison with a case in which the first guide surface 122a and the second guide surface 122b are formed with different inclinations from the base 130 to the inlet part 110 or a case in which the first guide surface 122a and the second guide surface 122b are formed with different inclinations from the inlet part 110 to the base 130. Accordingly, the fan 100 including the blade 120 according to an embodiment of the disclosure may have an effect of reducing resistance, noise, and/or vibration according to the air flow.

The base 130 may have a substantially disk shape. The base 130 may include a fan motor receiving portion 134 positioned in a substantially central portion of the base 130. The fan motor receiving portion 134 may be formed to receive the fan motor 109. The fan motor receiving portion 134 may extend along the rotation axis direction of the fan 100.

The fan outlet 139 may be formed between the inlet part 110 and the base 130. The base 130 may form the fan outlet 139 together with the inlet part 110. The fan outlet 139 may be formed along the circumference of the fan 100.

Figure 12:
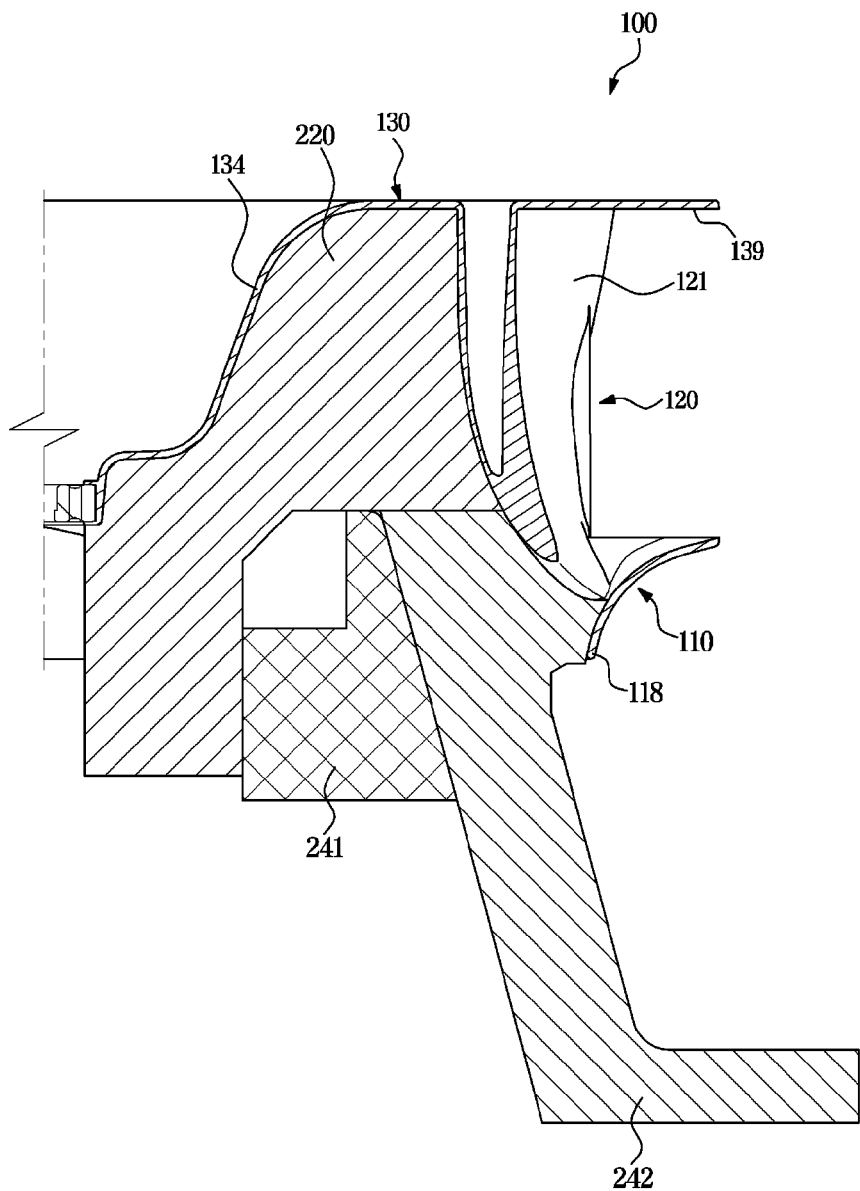
FIG. 12 is a view illustrating a state, in which the fan shown in FIG. 3 is molded using a mold, on the sectional view of FIG. 8.
Figure 13:
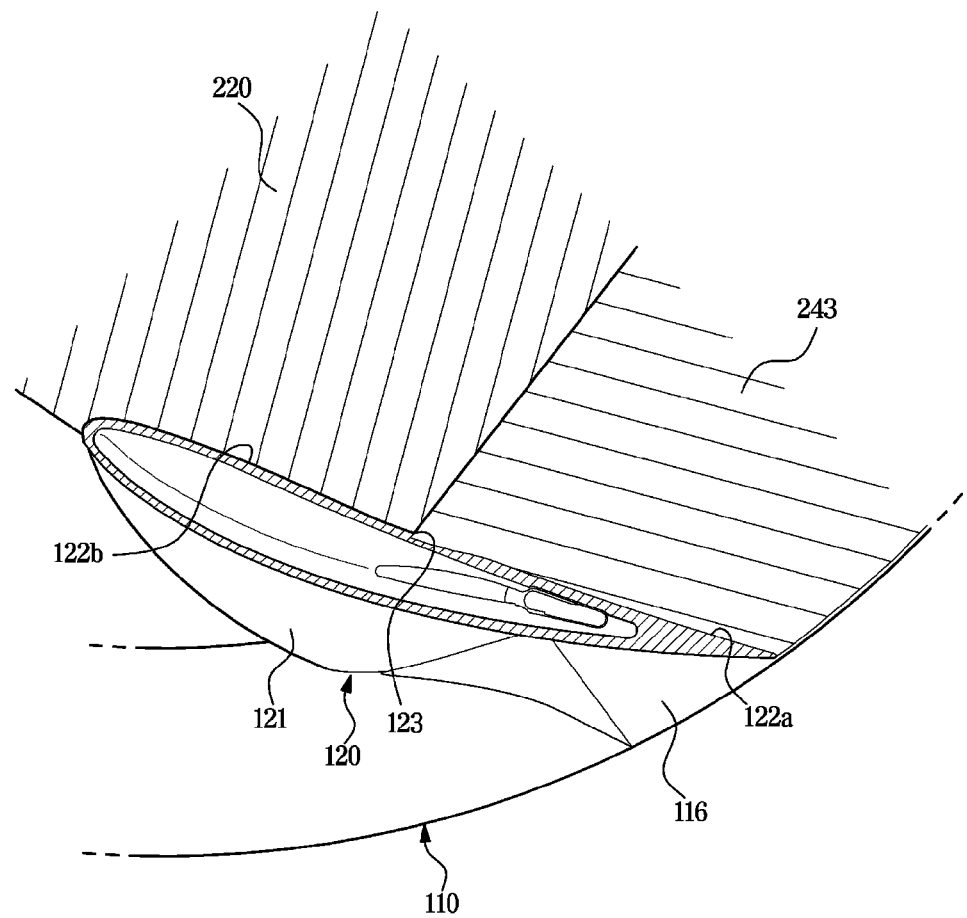
FIG. 13 is a view illustrating a state, in which the fan shown in FIG. 3 is molded using a mold, on the sectional view of FIG. 9.
Figure 14:
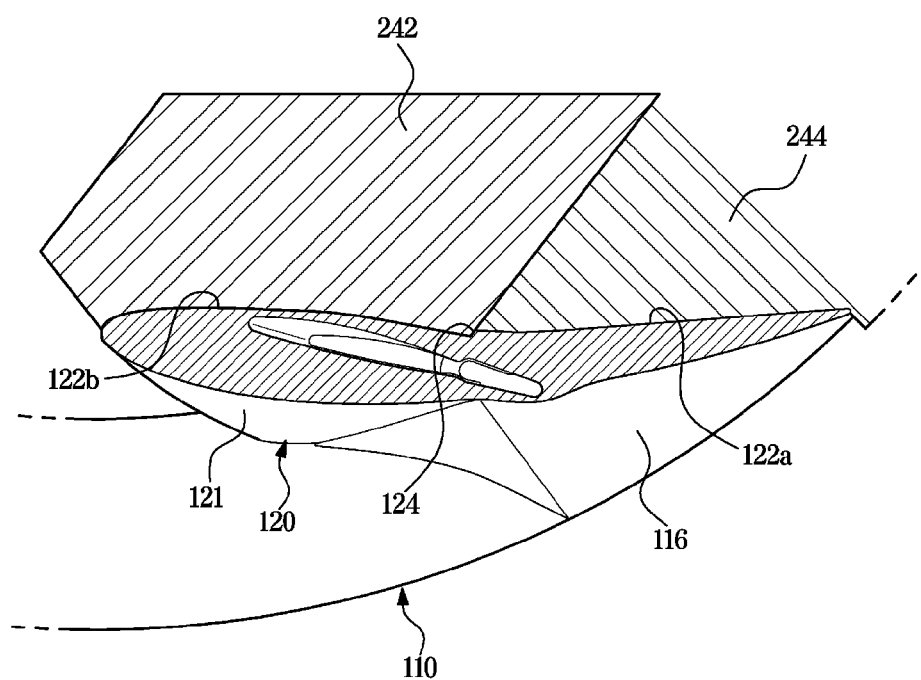
FIG. 14 is a view illustrating a state, in which the fan shown in FIG. 3 is molded using a mold, on the sectional view of FIG. 11.
Figure 15:
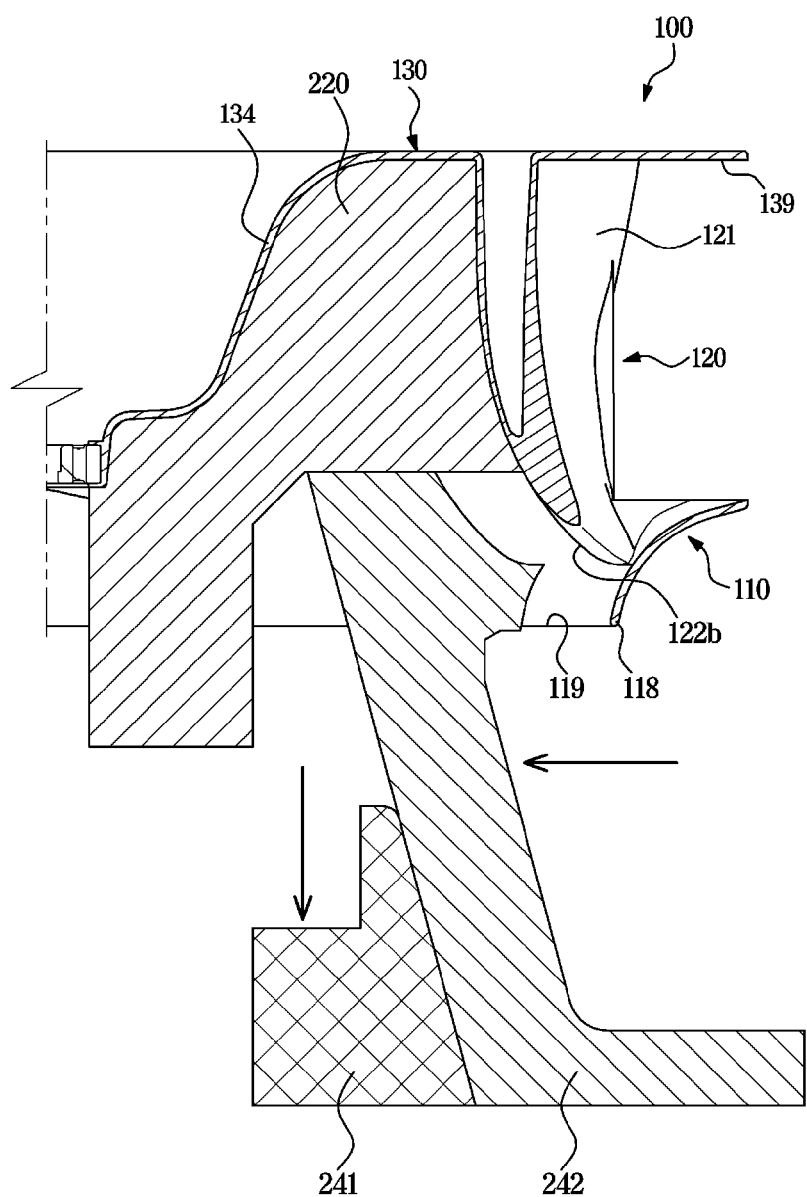
FIG. 15 is a view illustrating a state in which an inner core shown in FIG. 12 is separated from the fan.
Figure 16:
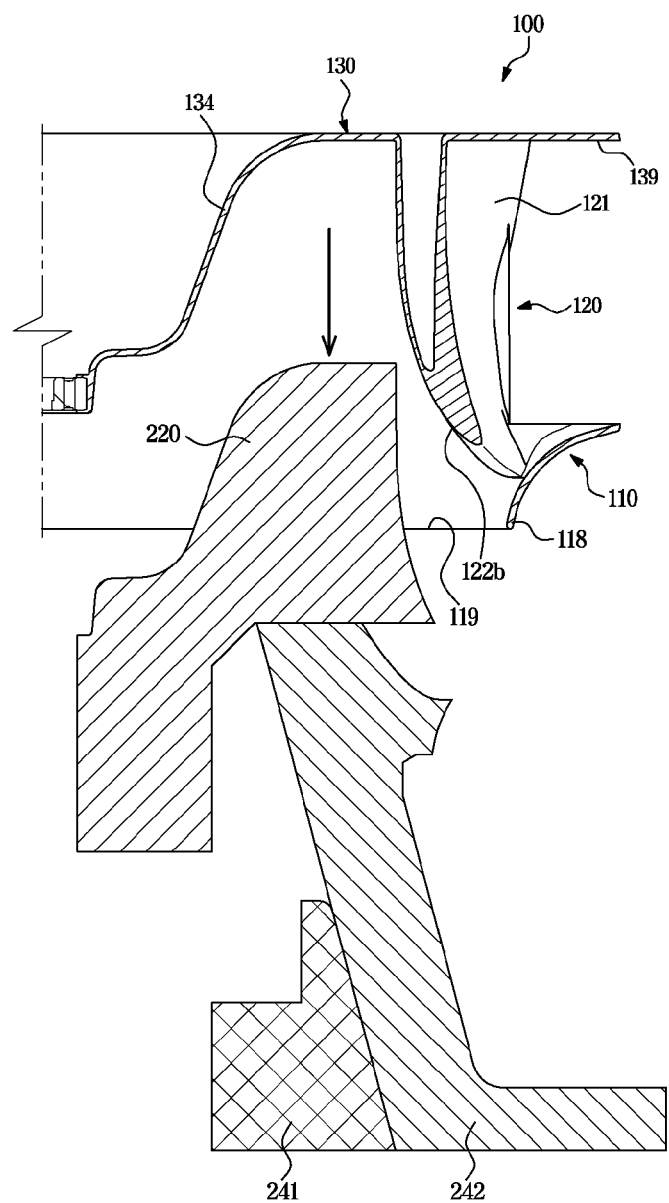
FIG. 16 is a view illustrating a state in which an inner mold shown in FIG. 15 is separated from the fan.
Figure 17:
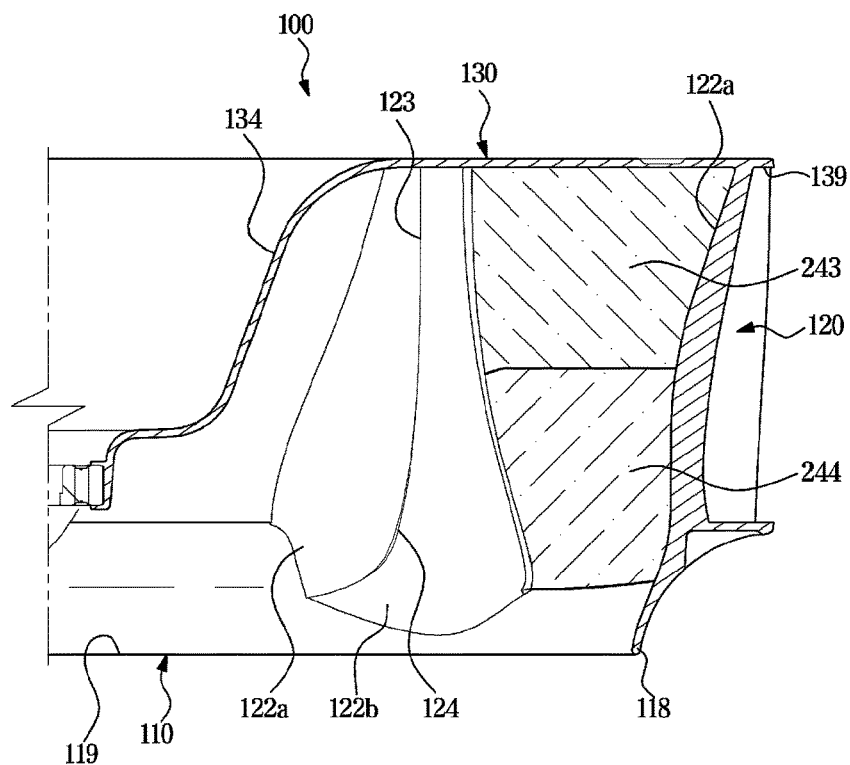
FIG. 17 is a view illustrating a state, in which the fan shown in FIG. 7 is molded using a mold, on the sectional view of FIG. 7.
Figure 18:
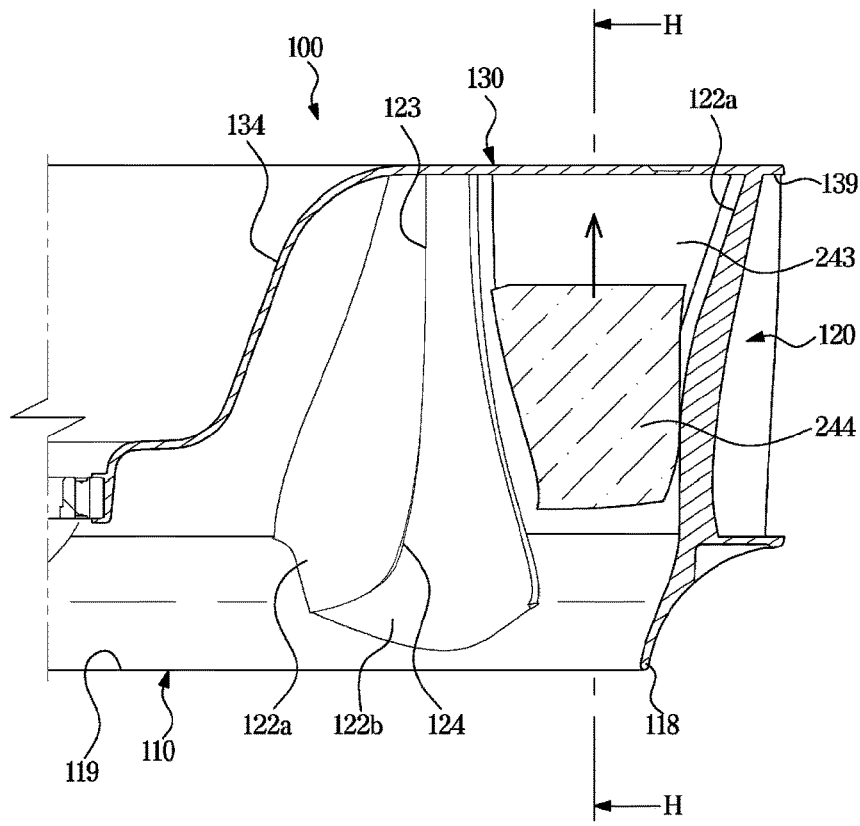
FIG. 18 is a view illustrating a state in which a second outer core is separated after a first outer core shown in FIG. 17 is separated.
Figure 19:
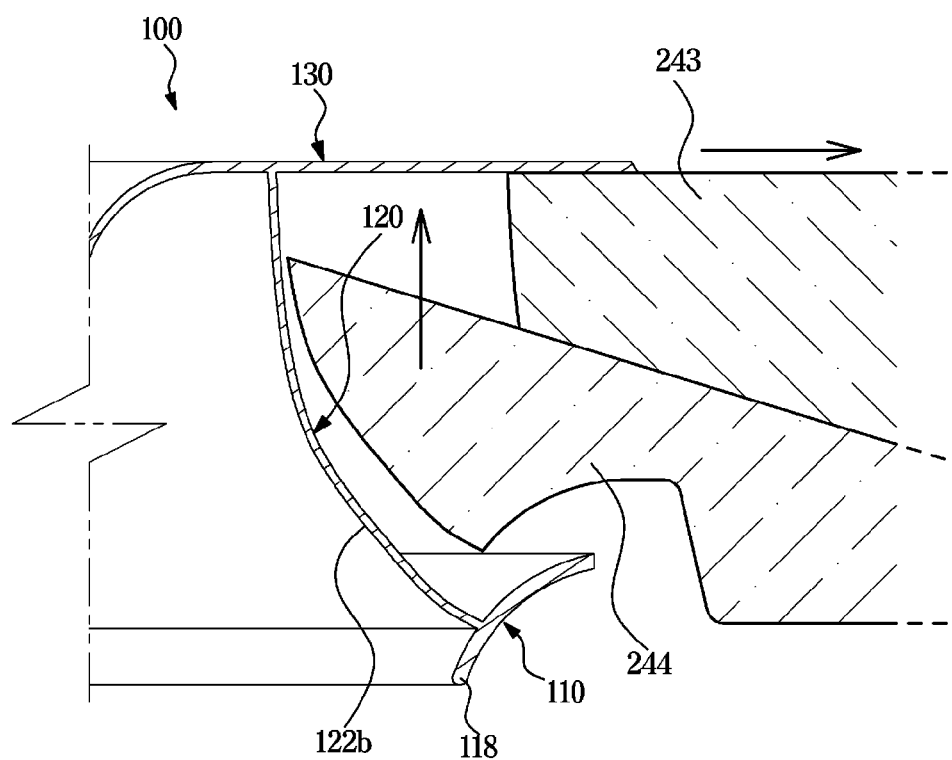
FIG. 19 is a sectional view taken along line H-H shown in FIG. 18.

FIG. 12 is a view illustrating a state, in which the fan shown in FIG. 3 is molded using a mold, on the sectional view of FIG. 8. FIG. 13 is a view illustrating a state, in which the fan shown in FIG. 3 is molded using a mold, on the sectional view of FIG. 9. FIG. 14 is a view illustrating a state, in which the fan shown in FIG. 3 is molded using a mold, on the sectional view of FIG. 11. FIG. 15 is a view illustrating a state, in which an inner core shown in FIG. 12 is separated from the fan. FIG. 16 is a view illustrating a state in which an inner mold shown in FIG. 15 is separated from the fan. FIG. 17 is a view illustrating a state, in which the fan shown in FIG. 7 is molded using a mold, on the sectional view of FIG. 7. FIG. 18 is a view illustrating a state in which a second outer core is separated after a first outer core shown in FIG. 17 is separated. FIG. 19 is a sectional view taken along line H-H shown in FIG. 18.

A process of molding the fan 100 using the molds 220, 241, 242, 243, and 244 will be described with reference to FIGS. 12 to 19. However, for convenience of description, components for molding one blade 120 will be described, and although not illustrated, the components described below may be provided to correspond to each of the plurality of blades. The fan 100 may be injection molded by injecting resin into the molds 220, 241, 242, 243, and 244.

Referring to FIG. 12, the molds 220, 241, 242, 243, and 244 may include an inner mold 220 and inner cores 241 and 242 for molding an interior of the fan 100. The inner mold 220 and a second inner core 242 may be provided to mold a portion of the second surface 122 of the blade 120.

A first inner core 241 may be provided to be slidable with respect to the second inner core 242. A first outer core 243 may be provided to be slidable with respect to a second outer core 244.

The first outer core 243 and the second outer core 244 may be coupled to each other to form the first surface 121 of the blade 120. The first outer core 243 may be located above the second outer core 244.

The inner mold 220 and the second inner core 242 may be coupled to each other to form the second surface 122 of the blade 120. The second mold 220 and the second inner core 242 may be located in a vertical direction.

Referring to FIGS. 13 and 14, the molds 220, 241, 242, 243, and 244 may include the inner mold 220, the second inner core 242 and the outer cores 243 and 244 for molding the second surface 122 of the blade 120. The outer cores 243 and 244 come into contact with the first guide surface 122a of the blade 120. The inner mold 220 and the second inner core 242 come into contact with the second guide surface 122b.

For example, referring to FIG. 13, the inner mold 220 and the first outer core 243 may mold an upper portion of the blade 120. The inner mold 220 and the first outer core 243 may come into contact with each other at a location corresponding to the first stepped portion 123 of the blade 120. Accordingly, the inner mold 220 and the first outer core 243 may be easily separated from the fan 100. The first outer core 243 is provided to mold the first stepped portion 123.

Referring to FIG. 14, the second inner core 242 and the second outer core 244 may mold a lower portion of the blade 120. The second inner core 242 and the second outer core 244 may come into contact with each other in the second stepped portion 124 of the blade 120. Accordingly, the second inner core 242 and the second outer core 244 may be easily separated from the fan 100. The second inner core 242 is provided to mold the second stepped portion 124.

Referring to FIG. 15, as the first inner core 241 is lowered, the second inner core 242 is moved toward the rotation axis of the fan 100. Accordingly, the second inner core 242 may be separated from the fan 100.

Referring to FIG. 16, as the second inner core 242 is separated from the fan 100, the inner mold 220 may be separated from the fan 100. At this time, because the second guide surface 122b of the blade 120 is inclined so as to be away from the rotation axis of the fan 100 in the radial direction as the second guide surface 122b is close to a lower end, the inner mold 220 may be easily separated toward the lower side of the fan 100.

Referring to FIGS. 17 and 19, the outer cores 243 and 244 may be separated from the fan 100 after the inner mold 220 and the inner cores 241 and 242 are separated.

Referring to FIG. 19, the first outer core 243 may be separated from the fan 100 in a direction substantially perpendicular to the rotation axis of the fan 100. For example, referring to FIG. 3 again, the first outer core 243 molding the blade marked with reference number 122 may be guided by the core guide 116 and then separated from the fan 100. The first outer core 243 may be separated from the fan 100 in a direction substantially perpendicular to the rotation axis of the fan 100, and thus the core guide 116 may be formed in a plane substantially perpendicular to the rotation axis of the fan 100.

Referring to FIGS. 18 and 19, as the first outer core 243 is separated from the fan 100, the second outer core 244 may be separated from the fan 100. For example, as the first outer core 243 is separated from the fan 100, the second outer core 244 may be moved upward. The second outer core 244 may be separated from the inlet part 110 of the fan 100 while being moved upward. The second outer core 244 separated from the inlet part 110 of the fan 100 may be separated from the fan 100 in a direction substantially perpendicular to the rotation axis of the fan 100 in the same manner as the first outer core 243.

In this case, because the first guide surface 122a of the blade 120 is inclined so as to be away from the rotation axis of the fan 100 in the radial direction as the first guide surface 122a is close to an upper end, the second outer core 244 may be easily separated to the upper side of the inlet part 110 of the fan 100.

While the disclosure has been described with reference to example embodiments, it should be understood by those of skilled in the art that various changes in form and details may be made without departing from the spirit and scope of the disclosure.

What is claimed is:

1. A fan, comprising:
   an inlet part disposed to form a fan inlet;
   a base disposed to form, together with the inlet part, a fan outlet; and
   a blade extending from the base to the inlet part, the blade including:
   a first surface formed to face outward in a radial direction; and
   a second surface formed to face inward in the radial direction, the second surface including:
   a first guide surface having an inclination toward an outside of the fan in a radial direction of the fan which changes in a direction from the inlet part toward the base; and
   a second guide surface having an inclination toward the outside of the fan in the radial direction which changes in a direction from the base toward the inlet part; and
   a stepped portion formed at a boundary between the first guide surface and the second guide surface, the stepped portion including:
   a first stepped portion having a surface which faces the first guide surface; and
   a second stepped portion having a surface which faces the second guide surface.

2. The fan of claim 1, wherein
   the inlet part includes a core guide disposed at a portion of the inlet part which is in contact with the first surface of the blade and the core guide is disposed in a plane perpendicular to a rotation axis of the fan.

3. The fan of claim 1, wherein
the inlet part includes an end portion, inclined at an angle with respect to a direction parallel to a rotation axis of the fan, to guide air, which is introduced from the fan inlet, to the fan outlet.

4. The fan of claim 1, wherein
the inlet part, the base, and the blade are integrally injection-molded so as to form a single piece.

5. The fan of claim 1, wherein
in response to rotating of the fan, a positive pressure is formed on the first surface and a negative pressure is formed on the second surface so that air is suctioned by the negative pressure formed on the second surface, and the suctioned air is discharged by the positive pressure formed on the first surface.

6. An air conditioner, comprising:
a housing;
a heat exchanger disposed inside the housing; and
a fan configured to suction air to an inside of the housing and discharge the air to an outside of the housing, the fan including:
a fan motor;
an inlet part through which air introduced to the inside of the housing is introduced;
a base to which the fan motor configured to rotate the fan is mounted, and
a blade extending from the base to the inlet part, the blade including:
  a first surface formed to face outward in a radial direction; and
  a second surface formed to face inward in the radial direction, the second surface including:
    a first guide surface inclined in a first direction;
    a second guide surface inclined in a second direction different from the first direction; and
    a stepped portion formed at a boundary between the first guide surface and the second guide surface, the stepped portion including:
      a first stepped portion having a surface which faces the first guide surface; and
      a second stepped portion having a surface which faces the second guide surface.

7. The air conditioner of claim 6, wherein
the fan is configured such that when the fan is rotated, a positive pressure is formed on the first surface and a negative pressure is formed on the second surface.

* * * * *